US012070842B2

(12) United States Patent
Wu et al.

(10) Patent No.: US 12,070,842 B2
(45) Date of Patent: Aug. 27, 2024

(54) ELECTRIC NAIL GUN

(71) Applicant: BASSO INDUSTRY CORP., Taichung (TW)

(72) Inventors: Jian-Rung Wu, Taichung (TW); Rui-Wen Wu, Taichung (TW)

(73) Assignee: Basso Industry Corp., Taichung (TW)

(*) Notice: Subject to any disclaimer, the term of this patent is extended or adjusted under 35 U.S.C. 154(b) by 32 days.

(21) Appl. No.: 18/080,827

(22) Filed: Dec. 14, 2022

(65) Prior Publication Data

US 2023/0191573 A1 Jun. 22, 2023

(30) Foreign Application Priority Data

Dec. 16, 2021 (TW) ................................ 110147222

(51) Int. Cl.
*B25C 1/04* (2006.01)
*B25C 1/00* (2006.01)
*B25C 1/06* (2006.01)

(52) U.S. Cl.
CPC .............. *B25C 1/042* (2013.01); *B25C 1/008* (2013.01); *B25C 1/06* (2013.01)

(58) Field of Classification Search
CPC ............ B25C 1/042; B25C 1/008; B25C 1/06
See application file for complete search history.

(56) References Cited

U.S. PATENT DOCUMENTS 11,338,421 B2 * 5/2022 Po .......................... B25C 1/047
11,559,876 B2 * 1/2023 Po .......................... B25C 1/06
2018/0036870 A1 * 2/2018 Komazaki ................ B25C 1/06
2023/0081812 A1 * 3/2023 Tam ...................... B25C 1/06
2023/0088831 A1 * 3/2023 Tam ...................... B25C 1/06
2023/0150101 A1 * 5/2023 Hietpas .................. B25C 1/04
227/130

FOREIGN PATENT DOCUMENTS

JP 2018051715 A 4/2018

* cited by examiner

*Primary Examiner* — Kenneth Bomberg
*Assistant Examiner* — Michael Quandt
(74) *Attorney, Agent, or Firm* — Burris Law, PLLC

(57) ABSTRACT

An electric nail gun includes a cylinder unit, a valve, a pushed rod, a safety assembly and an adjusting assembly. The cylinder unit defines a cylinder space and a gas space. The valve is disposed between the cylinder space and the gas space, and is movable among a closed position, in which the valve closes the cylinder space, and a plurality of open positions. The safety assembly has a first end that is adapted to be pressed and moved by an object, and a second end. When the first end is not pressed against the object, a distance between the second end and the pushed constituent is defined as a first actuating distance. When the first end is moved by the object, the pushed rod is urged to move by the second end such that the valve moves from the closed position to one of the open positions.

12 Claims, 14 Drawing Sheets

ELECTRIC NAIL GUN

CROSS-REFERENCE TO RELATED APPLICATION

This application claims priority to Taiwanese Invention Patent Application No. 110147222, filed on Dec. 16, 2021.

FIELD

The disclosure relates to an electric nail gun, and more particularly to an electric nail gun with adjustable nailing force.

BACKGROUND

Referring to FIGS. 1 and 2, a conventional electric nail gun 1 disclosed in Japanese Patent Publication No. 2018051715 includes a pressure accumulating chamber 11, a cylinder chamber 12, a lid member 13, a gear unit 14 and a piston unit (not shown). The pressure accumulating chamber 11 is for storing gas. The cylinder chamber 12 receives the gas from the pressure accumulating chamber 11 so that the piston unit may strike a nail (not shown). The lid member 13 is located between the pressure accumulating chamber 11 and the cylinder chamber 12, is rotatable relative to the pressure accumulating chamber 11 and the cylinder chamber 12, and cooperates with the pressure accumulating chamber 11 and the cylinder chamber 12 to define an opening (L0) through which the gas flows from the pressure accumulating chamber 11 into the cylinder chamber 12. The gear unit 14 is operable to urge the lid member 13 to rotate such that the size of the opening (L0) changes as the lid member 13 rotates. The amount of the gas that flows through the opening (L0) depends on the size of the opening (L0). Therefore, the nailing force of the conventional electric nail gun 1 is adjustable by operating the gear unit 14.

However, in order to make the conventional electric nail gun 1 capable of striking nails at a high speed, the pressure accumulating chamber 11 and the cylinder chamber 12 have to spatially and continuously communicate with each other via the opening (L0) (i.e., the diameter of the opening (L0) is maintained to be greater than 0). Consequently, when the conventional electric nail gun 1 experiences a mechanical failure, the nails may accidentally be discharged by the piston unit since the cylinder chamber 12 may keep receiving the gas from the pressure accumulating chamber 11. The conventional electric nail gun 1 may thus become dangerous to use.

In addition, because the gas in the pressure accumulating chamber 11 keeps pressing against the lid member 13, a larger rotational force is required to be exerted on the lid member 13 by the gear unit 14 so that the lid member 13 may be rotated. Thus, operation of the conventional electric nail gun 1 may not be easy for a user.

SUMMARY

Therefore, an object of the disclosure is to provide an electric nail gun that can alleviate at least one of the drawbacks of the prior art.

According to the disclosure, the electric nail gun includes a cylinder unit, a nail-striking unit, a valve unit and a muzzle unit. The cylinder unit defines a cylinder space, and a gas space that communicates with the cylinder space and that is adapted for storing gas. The nail-striking unit includes a piston assembly that extends through the cylinder space, that is movable in a first direction, and that is adapted for striking a nail. The gas space is isolated from the external environment when the nail-striking unit strikes the nail. The piston assembly is able to be driven by pneumatic power and electric power. The valve unit includes a valve and a pushed rod. The valve is disposed between the cylinder space and the gas space, and is movable among a closed position, in which the valve closes the cylinder space such that the gas in the gas space is refrained from entering the cylinder space, and a plurality of open positions. When the valve is in any one of the open positions, the valve cooperates with the cylinder unit to define an opening that is adapted for the gas to flow from the gas space into the cylinder space. A dimension of the opening in the first direction when the valve is in one of the open positions is different from the dimension of the opening in the first direction when the valve is in another one of the open positions. The pushed rod is connected to the valve, extends through the cylinder unit, and is movable relative to the cylinder unit in the first direction. The muzzle unit includes a nail gun seat, a safety assembly and an adjusting assembly. The nail gun seat is connected to the cylinder unit, and is adapted for loading the nail. The safety assembly is mounted to the nail gun seat, is movable relative to the nail gun seat in the first direction, and has a first end, a second end, and a plurality of positioning portions. The first end is adapted to be pressed and moved by an object. When the first end is not pressed against the object, a distance between the second end and the pushed rod in the first direction is defined as a first actuating distance. When the first end is moved by the object, the pushed rod is urged to move by the second end such that the valve moves from the closed position to one of the open positions. The positioning portions are arranged in the first direction. The adjusting assembly removably engages one of the positioning portions, and is operable to be separated from the one of the positioning portions to engage another one of the positioning portions so that the first actuating distance is adjusted.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
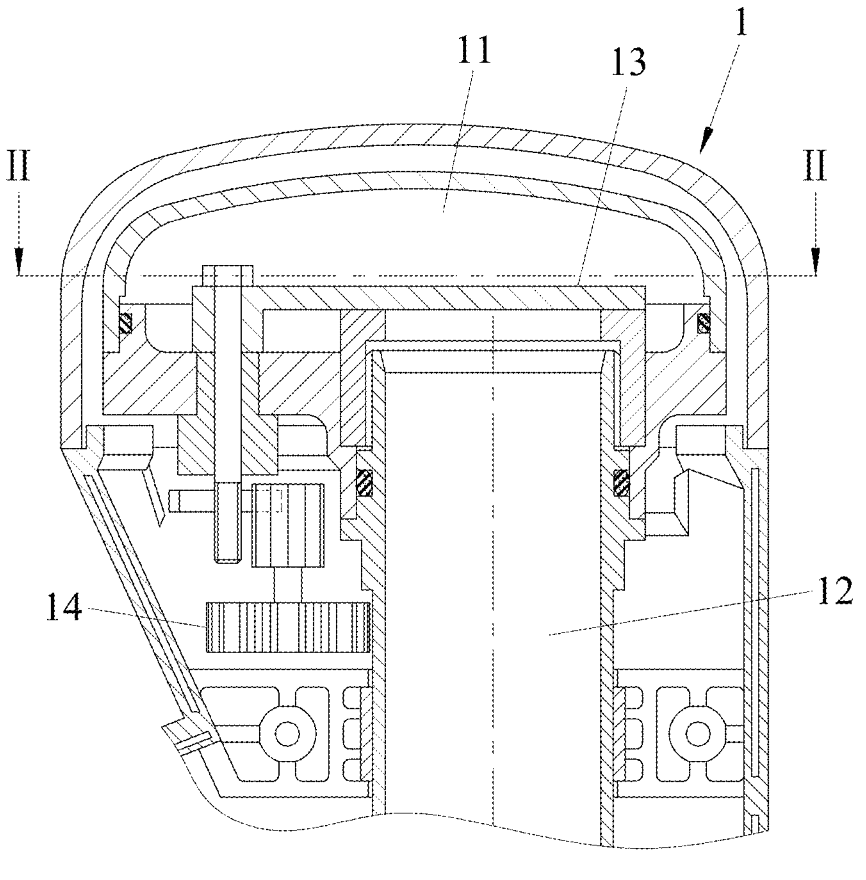
FIG.1 PRIOR ART
FIG. 1 is a fragmentary sectional view of a conventional electric nail gun disclosed in Japanese Patent Publication No. 2018051715.
Figure 2:
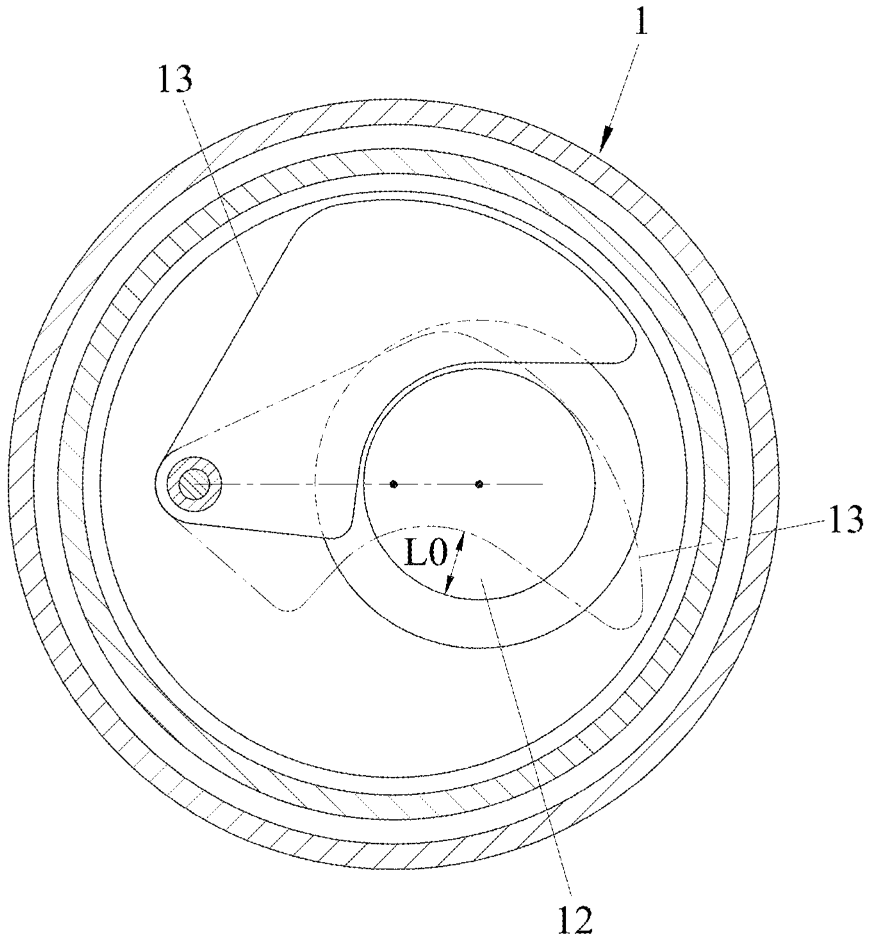
FIG.2 PRIOR ART
FIG. 2 is another sectional view of the conventional electric nail gun.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
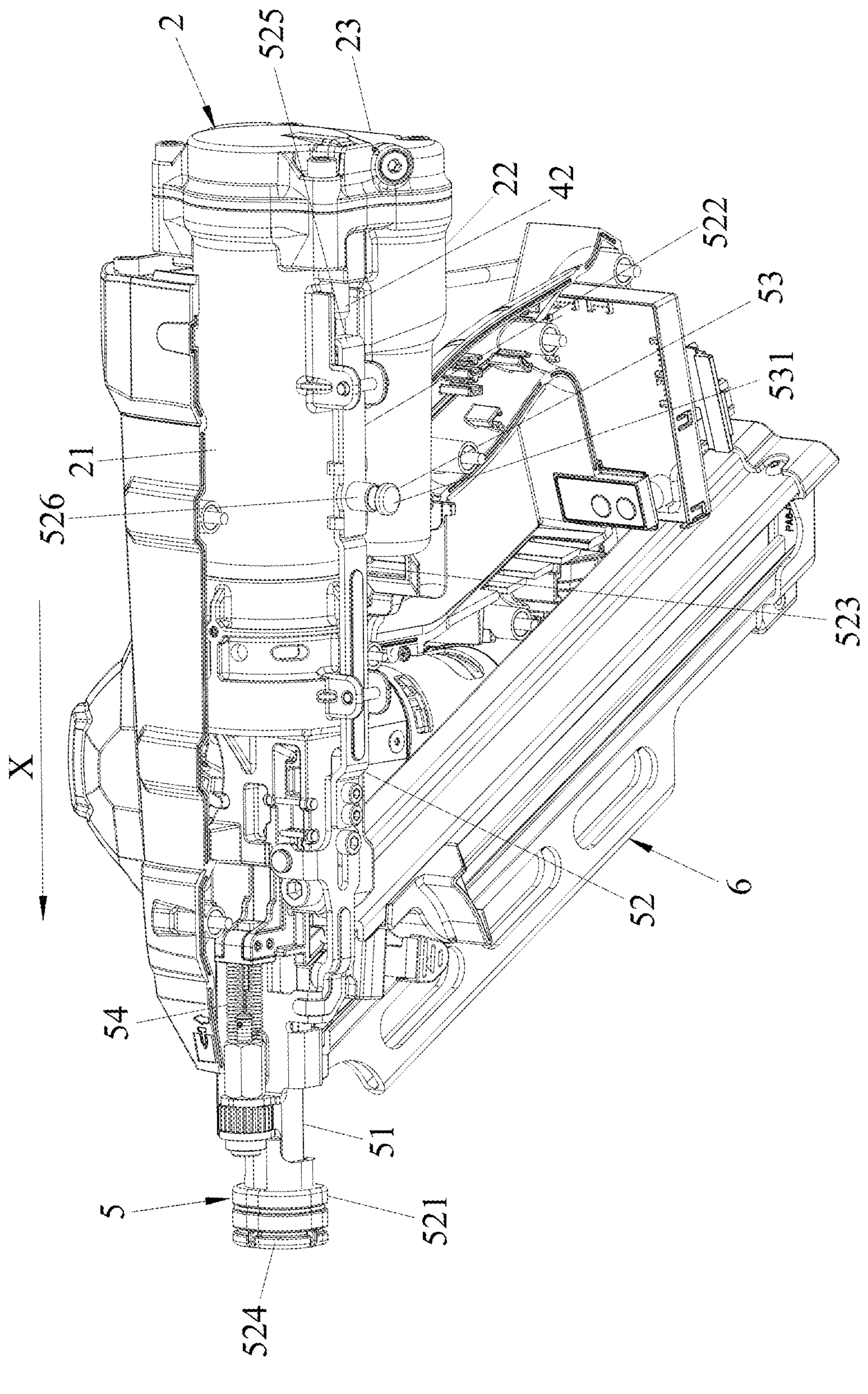
FIG. 3 is a fragmentary perspective view of a first embodiment of an electric nail gun according to the disclosure.
Figure 4:
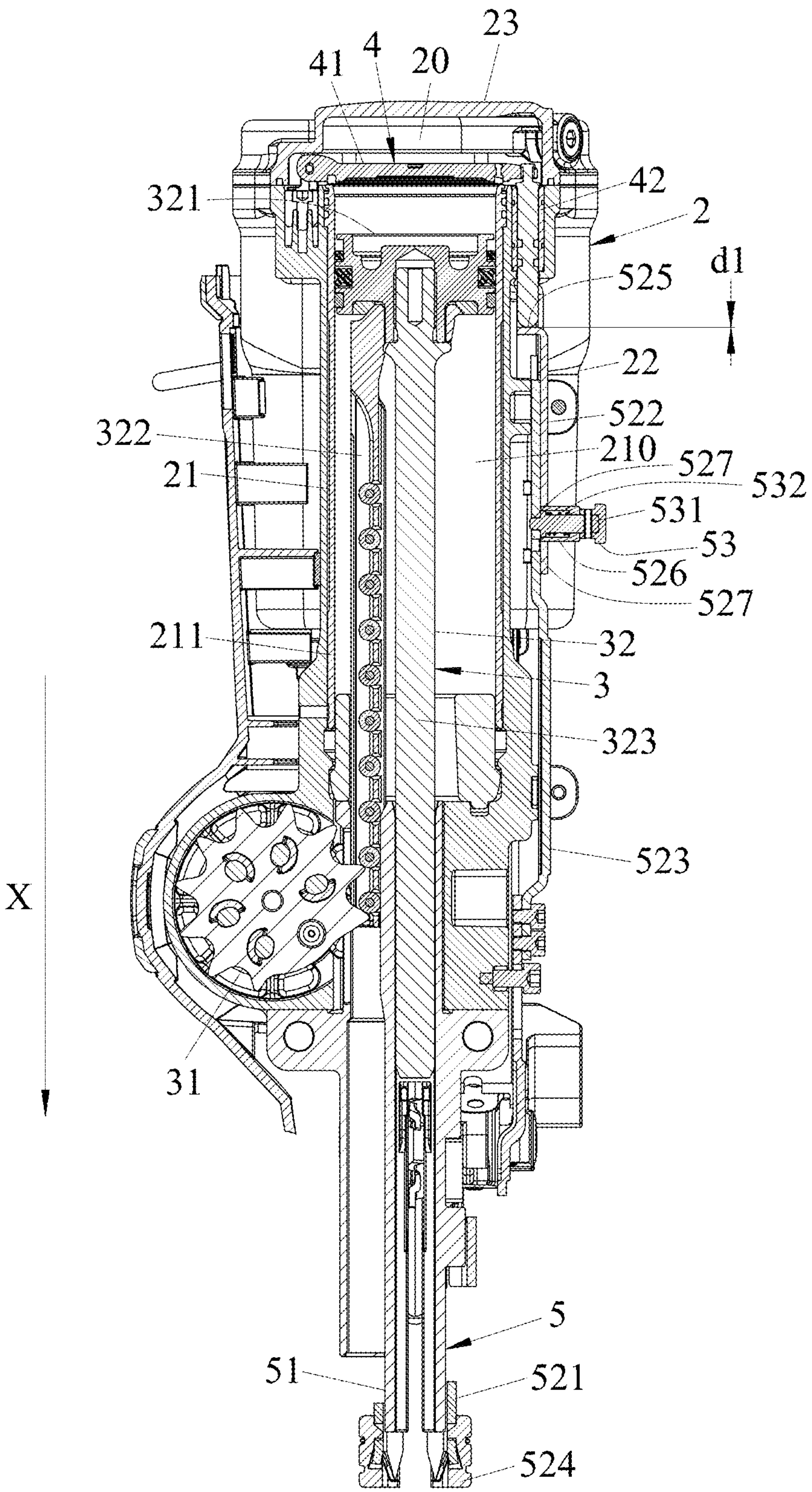
FIG. 4 is a sectional view of part of the first embodiment illustrating a valve of the embodiment in a closed position.

Referring to FIGS. 3 and 4, a first embodiment of an electric nail gun according to the disclosure includes a cylinder unit 2, a nail-striking unit 3, a valve unit 4, a muzzle unit 5 and a magazine unit 6.

The cylinder unit 2 includes a striking cylinder 21, a storage cylinder 22 and a cylinder lid 23. The striking cylinder 21 has a striking cylinder body 211 that defines a cylinder space 210. The storage cylinder 22 is adapted for storing gas. The cylinder lid 23 cooperates with the striking cylinder 21 and the storage cylinder 22 to define a gas space 20 that communicates with the cylinder space 210 and the storage cylinder 22, and that is adapted for storing the gas under a predetermined air pressure.

The nail-striking unit 3 includes a lifting gear 31 and a piston assembly 32. The lifting gear 31 is rotatably mounted between the cylinder unit 2 and the muzzle unit 5, and is able to be driven by electric power (e.g., an electric motor). The piston assembly 32 extends through the cylinder space 210, is movable in a first direction (X), is adapted for striking a nail, is able to be driven by pneumatic power and electric power, and includes a piston 321, a lifting rod 322 and a firing pin 323. The piston 321 abuts against an inner surface of the striking cylinder 21 airtightly. Each of the lifting rod 322 and the firing pin 323 is connected to the piston 321.

Figure 5:
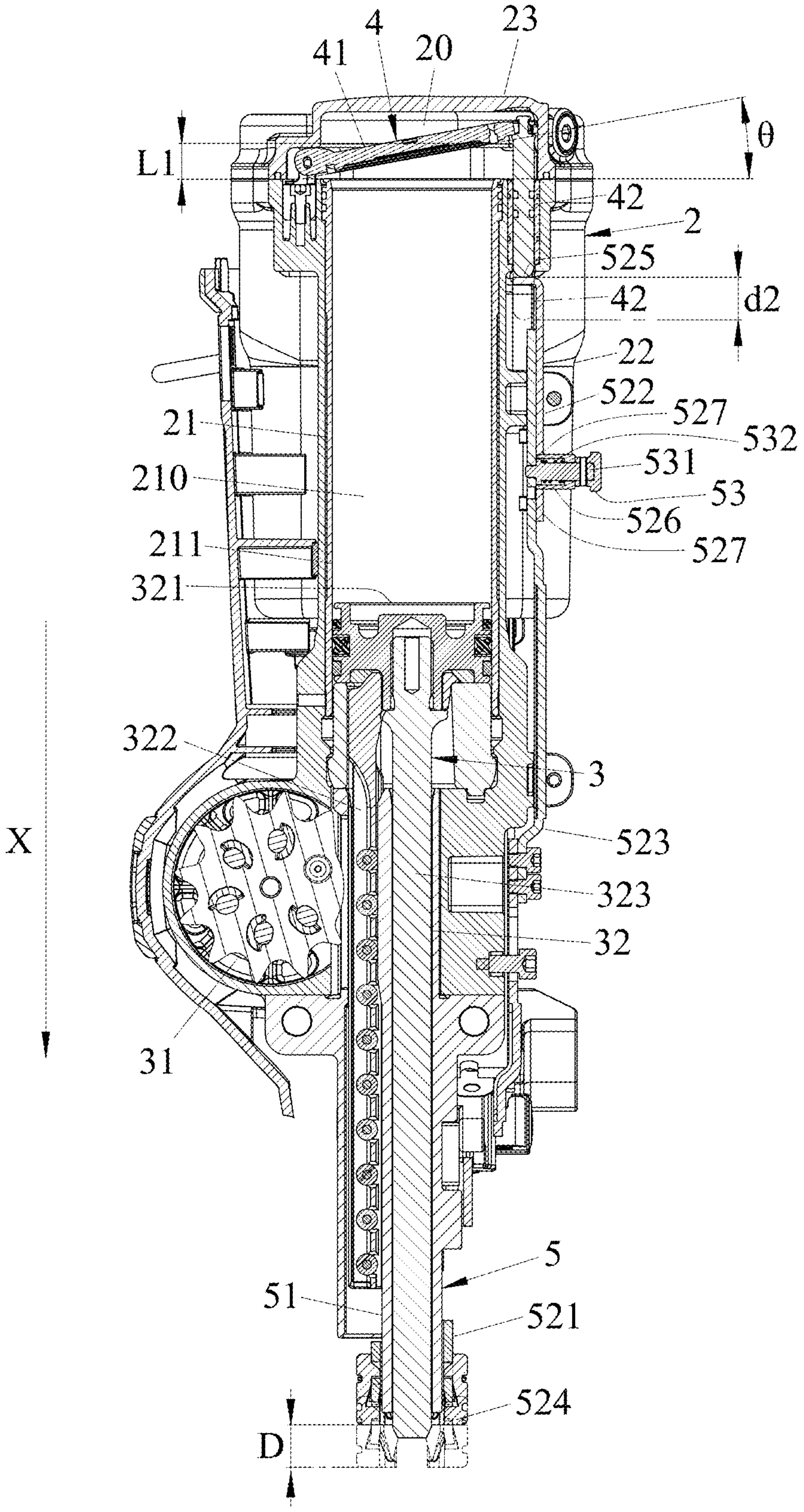
FIG. 5 is a view similar to FIG. 4 but illustrating the valve in one open position.
Figure 6:
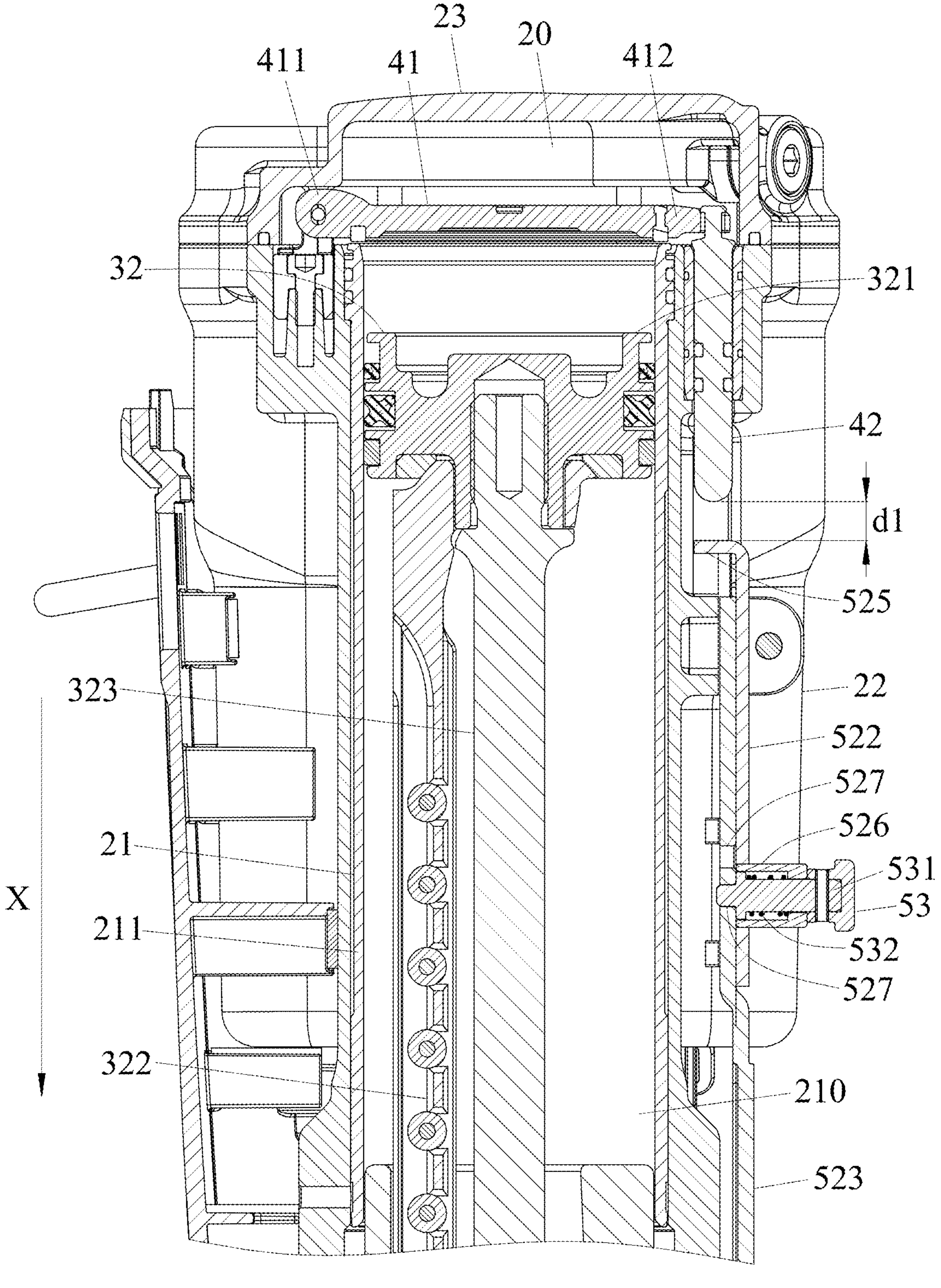
FIG. 6 is a fragmentary, enlarged sectional view illustrating a second end of the first embodiment and a pushed rod of the first embodiment spaced apart from each other by a first actuating distance.
Figure 7:
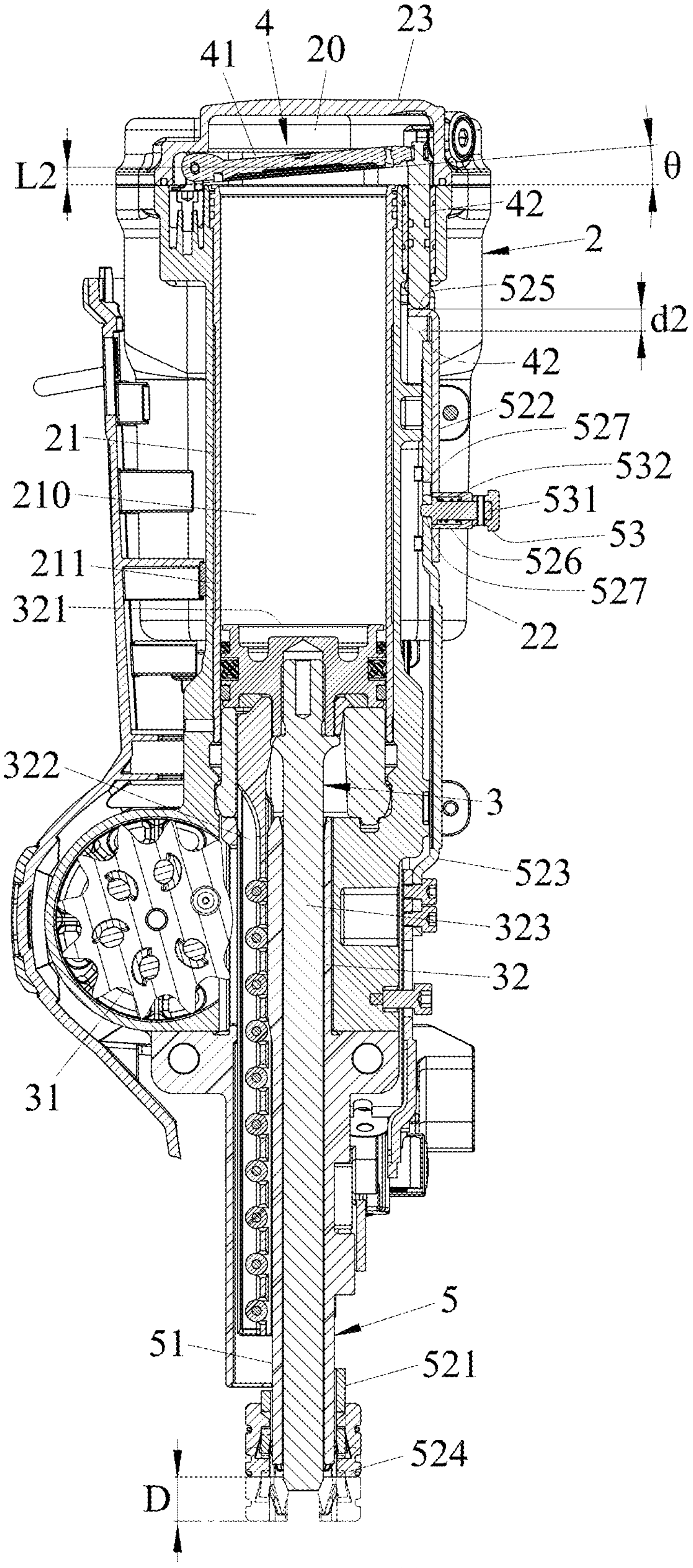
FIG. 7 is a view similar to FIG. 5 but illustrating the valve in another open position.
Figure 8:
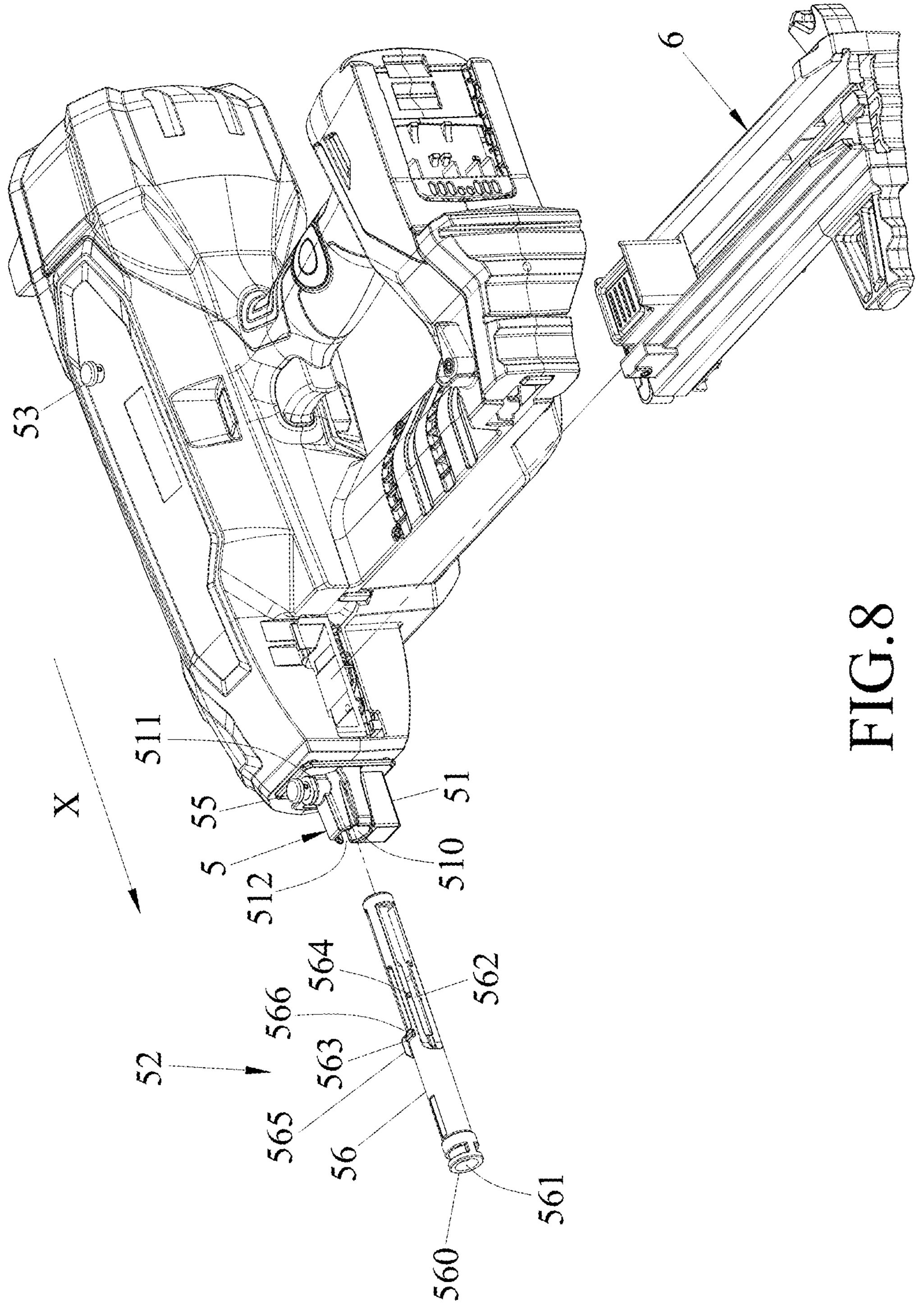
FIG. 8 is a partly exploded perspective view of a second embodiment of the electric nail gun according to the disclosure.
Figure 9:
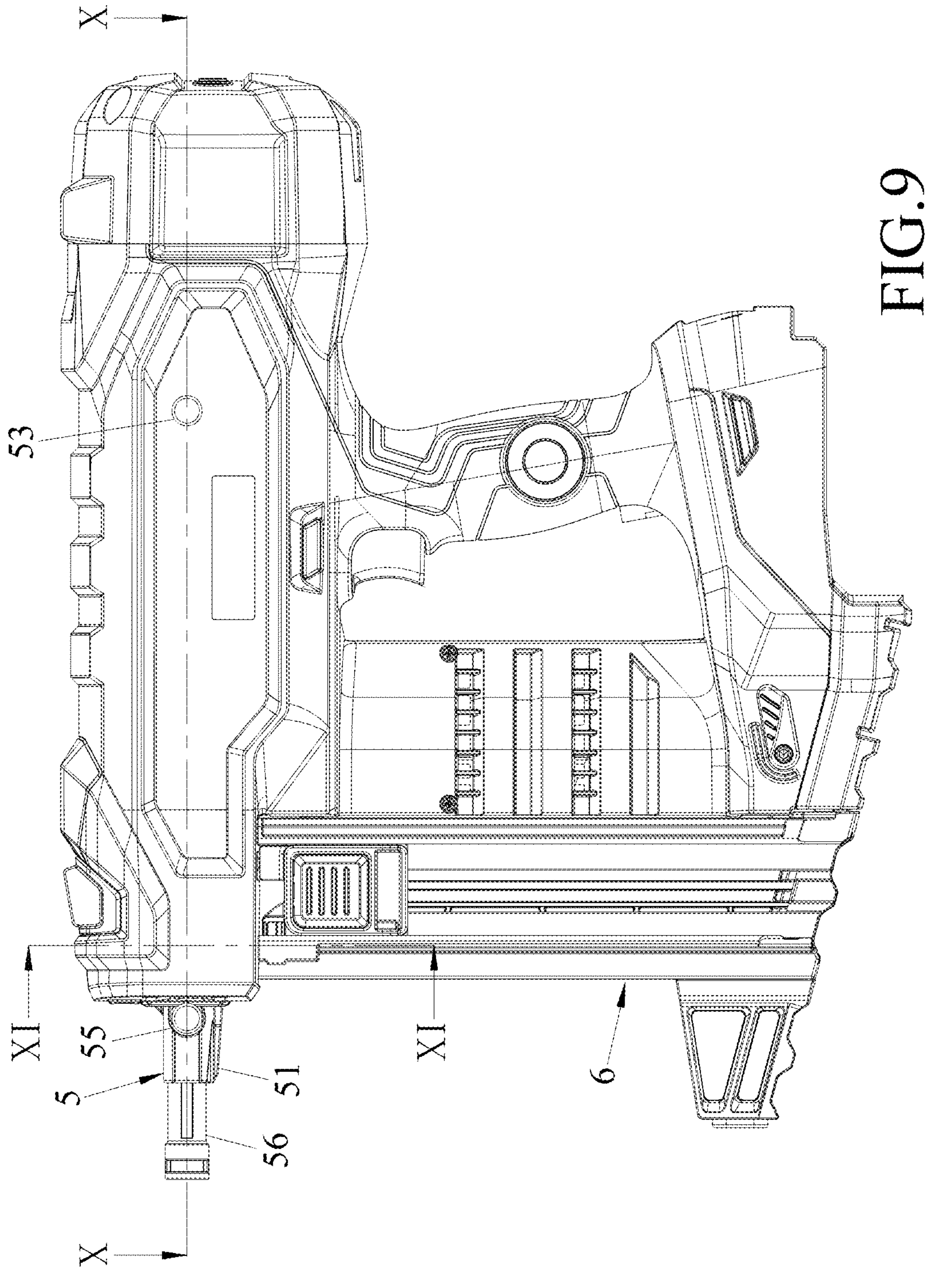
FIG. 9 is a side view of the second embodiment.
Figure 10:
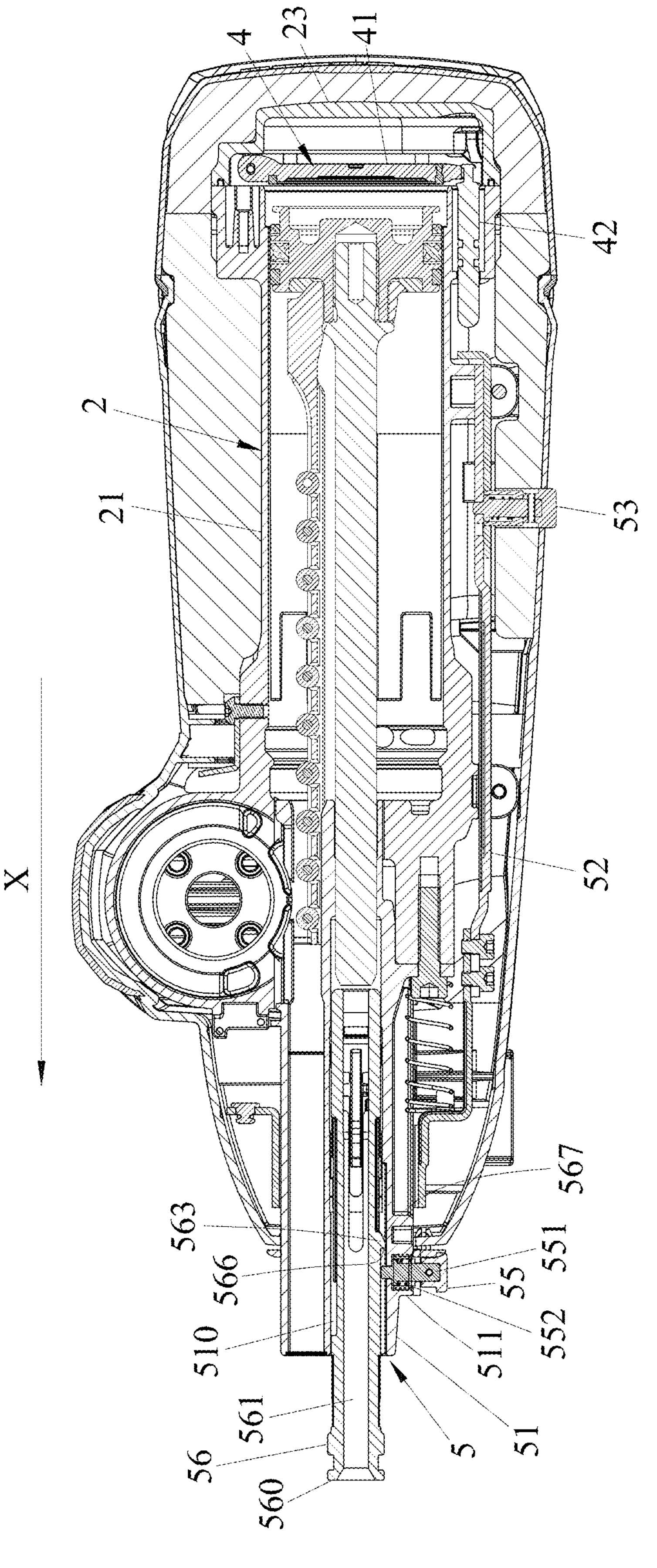
FIG. 10 is a sectional view taken along line X-X in FIG. 9.
Figure 11:
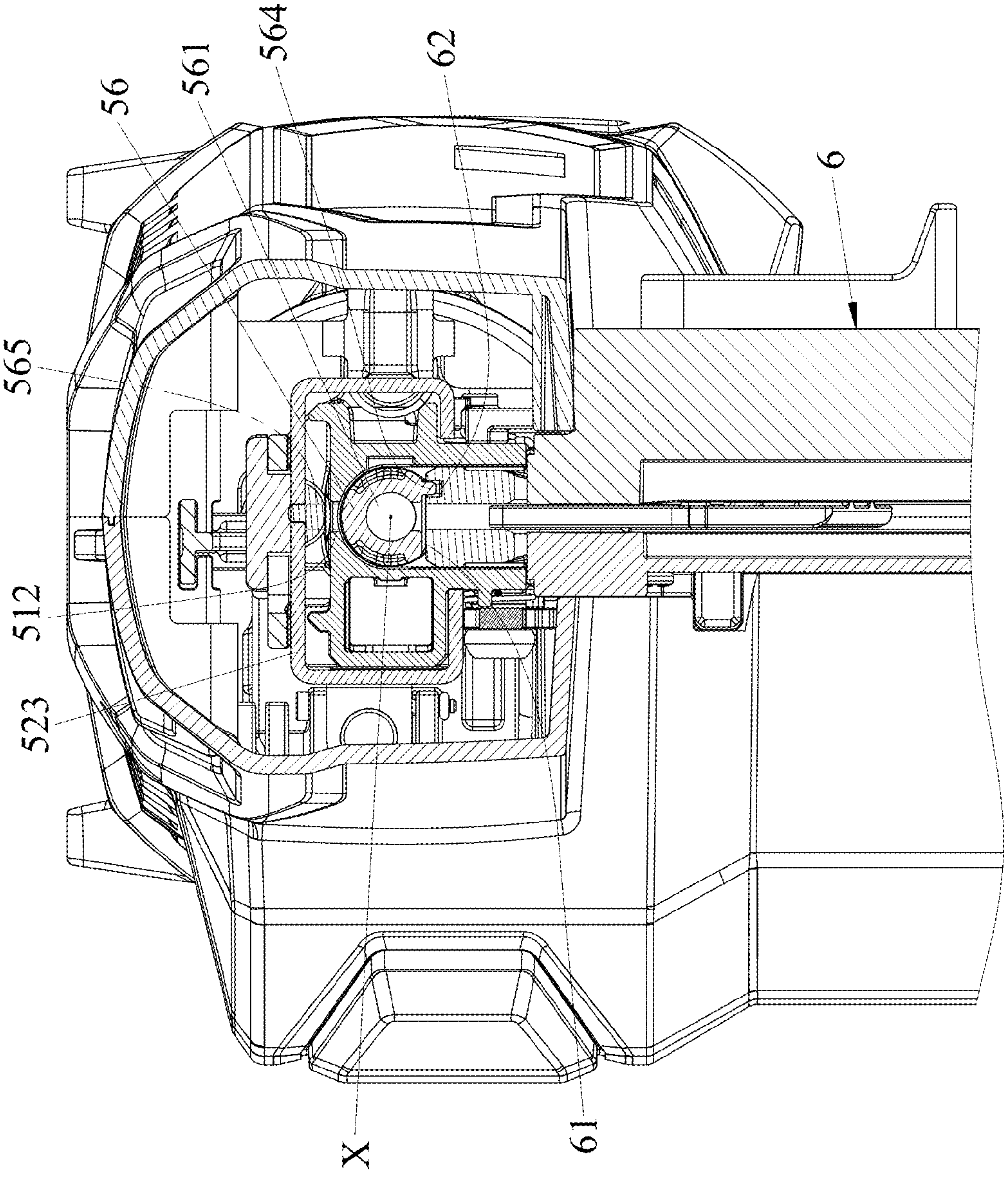
FIG. 11 is a fragmentary sectional view taken along line XI-XI in FIG. 9.

Referring further to FIGS. 5 to 7, the valve unit 4 includes a valve 41 and a pushed rod 42. The valve 41 is disposed between the cylinder space 210 and the gas space 20. The pushed rod 42 is connected to the valve 41, extends through the cylinder unit 2, and is movable relative to the cylinder unit 2 in the first direction (X). The valve 41 has a connecting portion 411 that is rotatably connected to the cylinder unit 2, and a moving portion 412 that is movable relative to the striking cylinder 21 via the connecting portion 411. The pushed rod 42 is connected to the moving portion 412.

The valve 41 is movable relative to the cylinder space 210 among a closed position (see FIGS. 4 and 6) and two open positions (see FIGS. 5 and 7, respectively). When the valve 41 is in the closed position, the valve 41 closes the cylinder space 210 such that the gas in the gas space 20 is refrained from entering the cylinder space 210. When the valve 41 is in any one of the open positions, the valve 41 cooperates with the cylinder unit 2 to define an opening that is adapted for the gas to flow from the gas space 20 into the cylinder space 210. A dimension of the opening in the first direction (X) when the valve 41 is in one of the open positions, which will be referred to as the dimension (L1), is different from the dimension of the opening in the first direction (X) when the valve 41 is in the other one of the open positions, which will be referred to as the dimension (L2). As shown in FIGS. 5 and 7, the dimension (L1) is greater than the dimension (L2).

It is noted that, by virtue of the gas space 20 storing the gas under the predetermined air pressure, the valve 41 is adapted to be constantly pushed away from the gas space 20 toward the closed position by the gas stored in the gas space 20 such that the pushed rod 42 is constantly urged to move away from the gas space 20 by the valve 41.

The muzzle unit 5 includes a nail gun seat 51, a safety assembly 52 (see FIG. 3), an adjusting assembly 53 and a resilient member 54 (see FIG. 3).

The nail gun seat 51 is connected to the cylinder unit 2, and is adapted for loading the nail (not shown). The lifting gear 31 is operable to convert between a first state, in which the lifting gear 31 meshes with the lifting rod 322 of the piston assembly 32 and is drivable by electric power to urge the piston assembly 32 to move away from the nail gun seat 51, and a second state, in which the lifting gear 31 is separated from the lifting rod 322 of the piston assembly 32.

The safety assembly 52 substantially extends in the first direction (X), is mounted to the nail gun seat 51, is movable relative to the nail gun seat 51 in the first direction (X), and includes a first safety member 521, a second safety member 522, and a third safety member 523 that interconnects the first and second safety members 521, 522. The first safety member 521 extends through the nail gun seat 51 and has a first end 524 that surrounds an end of the nail gun seat 51, and that is adapted to be pressed and moved by an object (not shown). The second safety member 522 is adjacent to the pushed rod 42, and has a second end 525 and a safety body 526. The second end 525 cooperates with the pushed rod 42 to define a first actuating distance (d1) in the first direction (X) therebetween. The second safety member 522 and the third safety member 523 overlap each other. The third safety member 523 has a plurality of positioning portions 527 that are arranged in the first direction (X). In this embodiment, each of the positioning portions 527 is configured to be a hole.

When the first end 524 of the safety assembly 52 is pressed and moved by the object, the first end 524 is moved through a maximum distance (D), and the pushed rod 42 is urged by the second end 525 of the safety assembly 52 to move through a second actuating distance (d2) such that the valve 41 moves from the closed position to one of the open positions. The valve 41 cooperates with an imaginary plane that is normal to the first direction (X) to define an angle (θ). The longer the second actuating distance (d2), the larger the angle (θ). The larger the angle (θ), the larger the dimension (L1, L2) of the opening defined by the valve 41 and the cylinder unit 2.

It is noted that, the maximum distance (D) equals the sum of the first actuating distance (d1) and the second actuating distance (d2), and is a predetermined constant that does not change. The first actuating distance (d1) is greater than or equal to zero.

The adjusting assembly 53 is mounted to the safety body 526, removably engages one of the positioning portions 527, is operable to be separated from the one of the positioning portions 527 to engage another one of the positioning portions 527, is operable to adjust the first actuating distance (d1), and includes a fastener member 531 and a resilient member 532 that is shown in the figures of the current embodiment as a spring. Specifically, the fastener member 531 extends through the safety body 526 toward the one of the positioning portions 527. The resilient member 532 is disposed between the fastener member 531 and the safety body 526, and resiliently biases the fastener member 531 such that the fastener member 531 engages the one of the positioning portions 527.

The resilient member 54 is mounted between the safety assembly 52 and the nail gun seat 51, and resiliently biases the safety assembly 52 in the first direction (X). The resilient member 54 is shown in the figures of the current embodiment as a spring.

The magazine unit 6 is removably connected to the nail gun seat 51, and is adapted for containing a plurality of nails (not shown) that are arranged in a row, and for pushing the nails into the nail gun seat 51 one by one.

For the sake of convenience, a direction opposite to the first direction (X) is defined as an up direction (i.e., the first direction (X) equals a down direction), and the lifting gear 31 and the adjusting assembly 53 are defined to be respectively located at left and right sides of the cylinder unit 2 (see FIG. 4).

Referring to FIGS. 3 and 4 again, when the electric nail gun is in an initial state, the piston 321 is located at an upper side of the striking cylinder 21 and is close to the cylinder lid 23, and the gas space 20 stores the gas under the predetermined air pressure. At this time, the valve 41 is in the closed position, the safety assembly 52 is in an initial position, and the lifting gear 31 meshes with the lifting rod 322.

Referring to FIGS. 4 and 5 again, when a user operates the electric nail gun to strike the nail into the object, the first end 524 of the first safety member 521 abuts against the object, and then the user urges the electric nail gun to move in the first direction (X) such that the first safety member 521 is moved upwardly relative to the nail gun seat 51. By virtue of the third safety member 523 interconnecting the first and second safety members 521, 522, when the first safety member 521 is moved upwardly, the first safety member 521 urges the second safety member 522 to move upwardly via the third safety member 523. After the second end 525 of the second safety member 522 travels the first actuating distance (d1), the second end 525 pushes the pushed rod 42 to travel the second actuating distance (d2) together. When the pushed rod 42 travels, the moving portion 412 of the valve 41 is urged to move synchronously such that the valve 41 moves from the closed position to one of the open positions. Consequently, the gas in the gas space 20 enters the cylinder space 210 and presses against the piston 321.

At this time, when the lifting gear 31 is driven by the electric power to rotate counterclockwise, the lifting gear 31 is separated from the lifting rod 322 (i.e., the lifting gear 31 is converted into the second state). Because the lifting rod 322 is not limited by the electric power when separated from the lifting rod 322, the piston 321 is pushed downwardly by the gas that enters the cylinder space 210. When the piston 321 is pushed downwardly, the piston 321 urges the firing pin 323 to slide relative to the nail gun seat 51 in the first direction (X), thereby striking the nail.

It is noted that, in FIG. 4, the second end 525 abuts against the pushed rod 42 before the first end 524 is moved by the object, which means that the first actuating distance (d1) in FIG. 4 equals 0. Because the maximum distance (D) of the first end 524 is a predetermined constant that equals the sum of the first actuating distance (d1) and the second actuating distance (d2), when the first actuating distance (d1) is small, the second actuating distance (d2) would be large, and vice versa. When the first actuating distance (d1) is 0 (i.e., the second actuating distance (d2) equals the maximum distance (D)), the angle (θ) is large, and so is the dimension (L1) of the opening (see FIG. 5) defined by the valve 41 and the cylinder unit 2. Consequently, a large amount of the gas in the gas space 20 may enter the cylinder space 210 to enable the electric nail gun to strike the nail with a large nailing force.

On the other hand, referring further to FIGS. 6 and 7, the first actuating distance (d1) is greater than 0. Thus, the second end 525 has to travel the first actuating distance (d1) before pushing and urging the pushed rod 42 to travel the second actuating distance (d2). Because the second actuating distance (d2) is now smaller as compared to the previous example where the second actuating distance (d2) is at the maximum (i.e., the second actuating distance (d2) equals the maximum distance (D)), the angle (θ) is smaller accordingly, and so is the dimension (L2) of the opening (see FIG. 7) defined by the valve 41 and the cylinder unit 2. Consequently, a smaller amount of the gas in the gas space 20 now enters the cylinder space 210 to enable the electric nail gun to strike the nail with a smaller nailing force.

It is noted that, the gas space 20 is isolated from the external environment when the nail-striking unit 3 strikes the nail. Specifically, the gas space 20 does not spatially communicate with the external environment during nail-striking (i.e., from the moment that the lifting gear 31 is converted from the first state into the second state by electric power to the moment that the nail is struck). In fact, the gas space 20 may only spatially communicate with the external environment, or be connected to a gas-filling device, when the air pressure in the gas space 20 is smaller than the predetermined air pressure so that the gas space 20 may be refilled with the gas to increase the air pressure therein.

The user may adjust the first actuating distance (d1) between the second end 525 and the pushed rod 42 when the user needs to adjust the nailing force of the electric nail gun. Specifically, the user may pull the fastener member 531 to the right to disengage the fastener member 531 from the one of the positioning portions 527 of the third safety member 523, and then move the second safety member 522 relative to the third safety member 523 to adjust a total length of the second and third safety members 522, 523 in the first direction (X). Afterwards, the user may release the fastener member 531 in another one of the positioning portions 527 such that the fastener member 531 engages the another one of the positioning portions 527 via the resilient member 532. The first actuating distance (d1) is thus adjusted.

After the nail is struck, when the first end 524 is not pressed upwardly by the object, the resilient member 54 resiliently biases the safety assembly 52 in the first direction (X) such that the safety assembly 52 is moved back to the initial position, and the valve 41 is not pushed upwardly by the pushed rod 42 such that the valve 41 is pushed back to the closed position by the gas stored in the gas space 20. At this time, the lifting gear 31 is driven by the electric power to keep rotating counterclockwise such that the lifting gear

31 meshes with the lifting rod 322 again (i.e., the lifting gear 31 is converted into the first state). When the lifting gear 31 is in the first state, the electric power drives the lifting gear 31 to urge the lifting rod 322 to move upwardly and away from the nail gun seat 51 such that the piston 321 and the firing pin 323 connected to the piston 321 are pushed upwardly by the lifting rod 322 (see FIGS. 5 and 4 sequentially). When the piston assembly 32 is driven by the electric power, via the lifting gear 31, to move upwardly, the gas in the cylinder space 210 is compressed by the piston assembly 32 such that air pressure in the cylinder space 210 increases. When the air pressure in the cylinder space 210 is greater than the air pressure in the gas space 20, the gas in the cylinder space 210 pushes the valve 41 from the closed position toward one of the open positions such that the gas in the cylinder space 210 is urged by the piston assembly 32 to enter the gas space 20. As the gas enters the gas space 20, the air pressure in the cylinder space 210 decreases. When the piston 321 is in a topmost position thereof (i.e., the lifting gear 31 may not urge the piston 321 to keep moving upwardly), the gas in the cylinder space 210 ceases to push the valve 41, and the valve 41 is pushed back to the closed position by the gas in the gas space 20. In short, the electric power drives the piston assembly 32 to move upwardly such that the air pressure in the gas space 20 is increased, and the pneumatic power drives the piston assembly to move downwardly so that the nail-striking operation may be completed.

Referring to FIGS. 8 to 11, a second embodiment of the electric nail gun according to the disclosure is generally similar to the first embodiment, but includes differences lying in the muzzle unit 5 and the magazine unit 6.

In the second embodiment, the muzzle unit 5 further includes a quick-disconnect assembly 55. The safety assembly 52 further includes a fourth safety member 56, and the first safety member 521 is omitted.

The nail gun seat 51 defines a safety passage 510 and includes a seat body 511. The seat body 511 has a seat groove 512 that extends in the first direction (X).

The quick-disconnect assembly 55 includes a quick-disconnect fastener 551 that extends through the seat body 511 and that is movable relative to the seat body 511, and a quick-disconnect resilient member 552 that is disposed between the seat body 511 and the quick-disconnect fastener 551, and that resiliently biases the quick-disconnect fastener 551 such that the quick-disconnect fastener 551 extends through the seat body 511 into the safety passage 510.

The fourth safety member 56 is removably disposed in the safety passage 510, and is movable relative to the safety passage 510. The fourth safety member 56 defines a nail passage 561 that is adapted for the nail (not shown) to travel through during nail-striking, and has a first end 560, a nail-entering opening 562, a push block 563, a protruding rib 564 and a slide block 565. The first end 560 has the same functions as the first end 524 of the first safety member 521 of the first embodiment. The nail-entering opening 562 is adapted for the nail in the magazine unit 6 to enter the nail passage 561. The push block 563 protrudes from an outer surface of the fourth safety member 56, and has a blocking surface 566 that is adjacent to the first end 560, and a guiding surface 567 that is located at one side of the blocking surface 566 opposite to the first end 560. The protruding rib 564 protrudes from the outer surface of the fourth safety member 56 and is spaced apart from the push block 563. The slide block 565 extends through the seat groove 512 and abuts against the third safety member 523 when the fourth safety member 56 is disposed in the safety passage 510.

Figure 12:
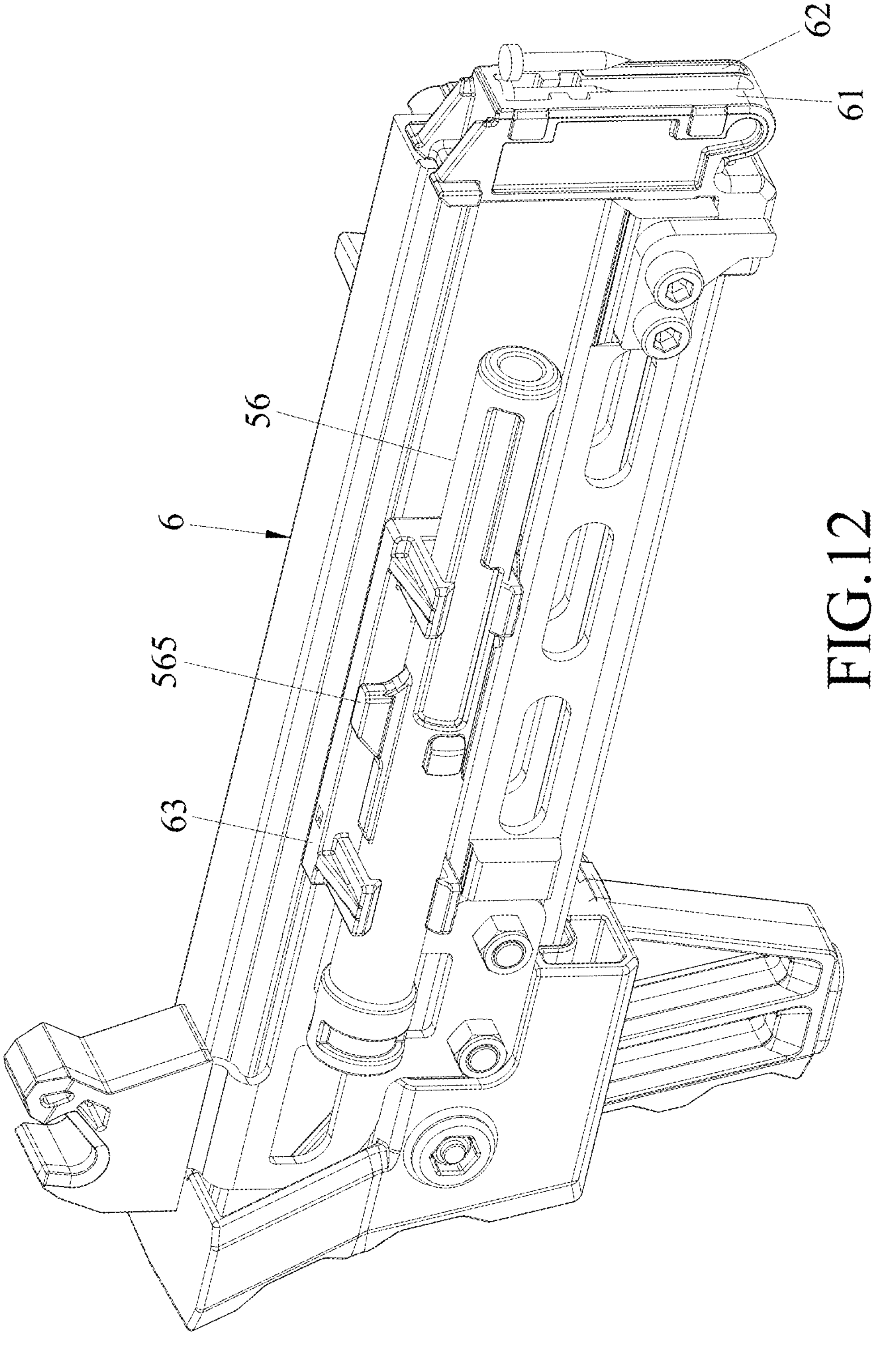
FIG. 12 is a perspective view of part of the second embodiment illustrating one safety member of the second embodiment clamped by a magazine unit of the second embodiment.

Referring further to FIG. 12, the magazine unit 6 is removably connected to the nail gun seat 51, and has a safety facing surface 61, a guiding groove 62 and a clamp member 63. The safety facing surface 61 faces the fourth safety member 56 when the fourth safety member 56 is disposed in the safety passage 510 and when the magazine unit 6 is connected to the nail gun seat 51. The guiding groove 62 is recessed from the safety facing surface 61 and extends in the first direction (X). The clamp member 63 is located at one side of the magazine unit 6. The guiding groove 62 is coupled to the protruding rib 564 such that the fourth safety member 56 is refrained from rotating when the fourth safety member 56 is disposed in the safety passage 510. The fourth safety member 56 is slidable along the guiding groove 62 in the first direction (X) via the protruding rib 564.

When the fourth safety member 56 needs to be assembled to the nail gun seat 51, an end of the fourth safety member 56 opposite to the first end 560 is urged to move in the up direction toward the safety passage 510, and the slide block 565 is aligned with the seat groove 512 in the up direction such that the fourth safety member 56 is inserted into the safety passage 510. When the fourth safety member 56 moves in the up direction in the safety passage 510, the slide block 565 moves along the seat groove 512, and the guiding surface 567 of the push block 563 pushes the quick-disconnect fastener 551 away from the safety passage 510. Then, when the push block 563 moves past the quick-disconnect fastener 551, the quick-disconnect fastener 551 is resiliently biased by the quick-disconnect resilient member 552 such that the quick-disconnect fastener 551 enters the safety passage 510 again. At this time, the quick-disconnect fastener 551 blocks the blocking surface 566 of the push block 563 such that when the magazine unit 6 is either connected to or removed from the nail gun seat 51, the fourth safety member 56 is movable along the safety passage 510 but is refrained from leaving the safety passage 510 in the first direction (X) by the quick-disconnect fastener 551. When the magazine unit 6 is connected to the nail gun seat 51, the protruding rib 564 moves along the guiding groove 62 while the fourth safety member 56 moves along the safety passage 510.

When the fourth safety member 56 needs to be disassembled from the nail gun seat 51, the user may pull the quick-disconnect fastener 551 away from the safety passage 510 such that the push block 563 is not blocked by the quick-disconnect fastener 551. Then, the user may pull the fourth safety member 56 in the first direction (X) until the fourth safety member 56 is removed from the nail gun seat 51. Afterwards, the user may store the fourth safety member 56 that is removed from the nail gun seat 51 by using the clamp member 63 (i.e., the fourth safety member 56 may be clamped by the clam member 63) so that the fourth safety member 56 is not lost.

It is noted that, in one embodiment, the magazine unit 6 may have a different configuration that is exclusively for one of several types of nails, and the fourth safety member 56 may have a different configuration that is exclusively for the magazine unit 6 of the one embodiment. For example, referring to FIGS. 9, 11 and 12 again, the magazine unit 6 is adapted for containing common nails. The guiding groove 62 is located at a right side of the magazine unit 6, and the protruding rib 564 protrudes from a right side of the outer surface of the fourth safety member 56 accordingly. By virtue of the guiding groove 62 and the protruding rib 564 being respectively located at the right sides of the magazine unit 6 and the fourth safety member 56, the fourth safety member 56 and the magazine unit 6 are prevented from being miscoupled, so as to ensure the user's safety.

Figure 13:
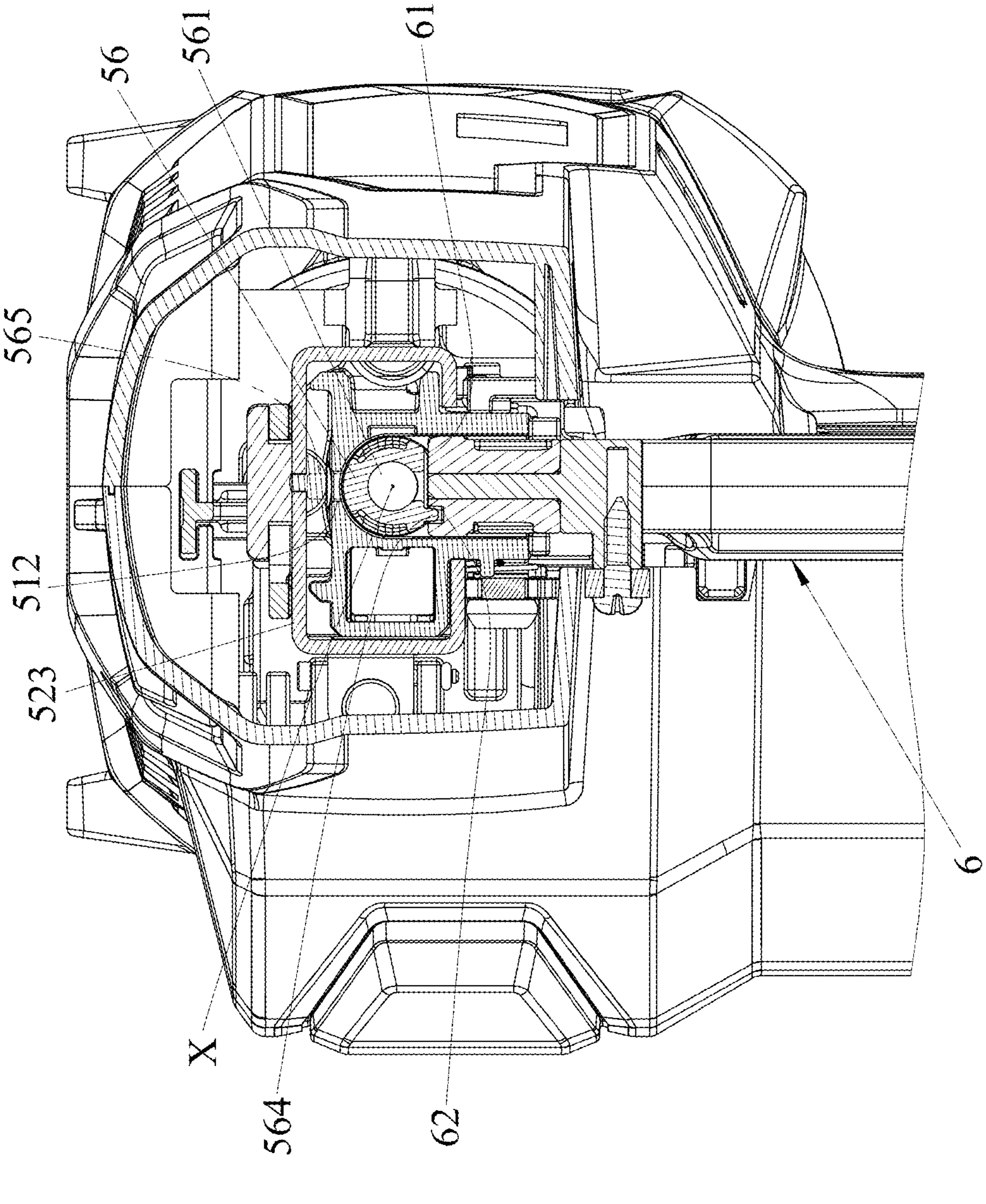
FIG. 13 is a view similar to FIG. 11 but illustrating different configurations of the safety member and the magazine unit.
Figure 14:
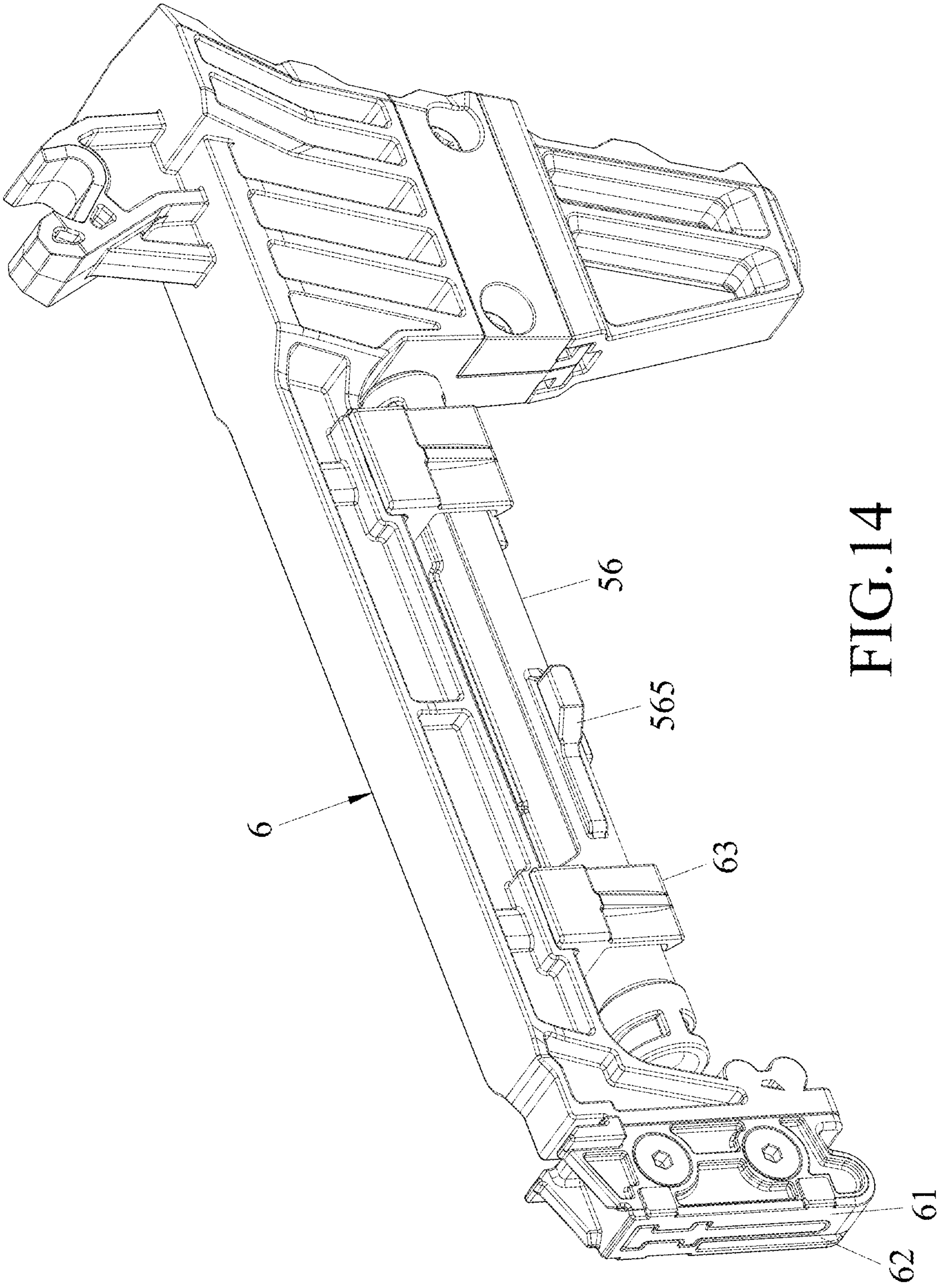
FIG. 14 is a view similar to FIG. 12 but illustrating a different configuration of the magazine unit.

It is noted that, referring to FIGS. 13 and 14, the magazine unit 6 has a different configuration that is adapted for containing nails of another type. In this instance, the guiding groove 62 is located at a left side of the magazine unit 6, and the protruding rib 564 protrudes from a left side of the outer surface of the fourth safety member 56 accordingly. Likewise, the magazine unit and the fourth safety member 56 are prevented from being miscoupled, and the user's safety is thus ensured. In addition, the clamp member 63 is located at a different side of the magazine unit 6 such that the fourth safety member 56 may be clamped at a different location.

In summary, the embodiments of the electric nail gun offer several benefits as follows.

When the electric nail gun is in the initial state, the valve 41 is in the closed position and spatially separates the gas space 20 from the cylinder space 210 so that the piston assembly 32 is not driven by the pneumatic power provided by the predetermined air pressure in the gas space 20. Therefore, even when the lifting gear 31 experiences malfunctions such that the lifting gear 31 is separated from the lifting rod 322, the amount of the gas in the cylinder space 210 may not generate a pressure that is large enough to push the piston assembly 32 downwardly. A user's safety when operating the electric nail gun is thus guaranteed.

The valve 41 is urged to move by the safety assembly 52 instead of additional electric power, and the configurations of the valve 41 and the safety assembly 52 are relatively simple. Therefore, the electric nail gun is energy-saving and the service life thereof may be prolonged.

By virtue of the first actuating distance (d1) being adjustable, the electric nail gun is provided with an adjustable nailing force that meets various customer demands.

Furthermore, when the user needs to adjust the nailing force of the electric nail gun, the user may simply pull the fastener member 531 so that the fastener member 531 is disengaged from one of the positioning portions 527 of the third safety member 523. Thus, the electric nail gun is user-friendly.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric nail gun comprising:

a cylinder unit defining a cylinder space, and a gas space that communicates with said cylinder space and that is adapted for storing gas;

a nail-striking unit including a piston assembly that extends through said cylinder space, that is movable in a first direction, that is adapted for striking a nail, and that is able to be driven by pneumatic power and electric power, the gas space being isolated from the external environment when said nail-striking unit strikes the nail;

a valve unit including a valve that is disposed between said cylinder space and said gas space, and that is movable among a closed position, in which said valve closes said cylinder space such that the gas in said gas space is refrained from entering said cylinder space, and a plurality of open positions, when said valve is in any one of the open positions, said valve cooperating with said cylinder unit to define an opening that is adapted for the gas to flow from said gas space into said cylinder space, a dimension of said opening in the first direction when said valve is in one of the open positions being different from the dimension of said opening when said valve is at another one of the open positions, and a pushed rod that is connected to said valve, that extends through said cylinder unit, and that is movable relative to said cylinder unit in the first direction; and a muzzle unit including a nail gun seat that is connected to said cylinder unit, and that is adapted for loading the nail, a safety assembly that is mounted to said nail gun seat, that is movable relative to said nail gun seat in the first direction, and that has a first end adapted to be pressed and moved by an object, a second end, when said first end is not pressed against the object, a distance between said second end and said pushed rod in the first direction being defined as a first actuating distance, when said first end is moved by the object, said pushed rod being urged to move by said second end such that said valve moves from the closed position to one of the open positions, and a plurality of positioning portions arranged in the first direction, each of said positioning portions being configured to be a hole, and an adjusting assembly that includes a spring and a fastener member which removably engages one of said positioning portions, and that is operable to be separated from the one of said positioning portions to engage another one of said positioning portions so that the first actuating distance is adjusted.

2. The electric nail gun as claimed in claim 1, wherein: when said first end of said safety assembly is pressed by the object, said first end is moved through a maximum distance, and said pushed rod is urged by said second end of said safety assembly to move through a second actuating distance; and the maximum distance equals a sum of the first actuating distance and the second actuating distance, the first actuating distance being greater than or equal to zero.

3. The electric nail gun as claimed in claim 2, wherein:

said valve has a connecting portion that is rotatably connected to said cylinder unit, and a moving portion that is movable relative to said cylinder unit via said connecting portion, said pushed rod being connected to said moving portion; and said valve is adapted to be constantly pushed away from said gas space toward the closed position by the gas stored in said gas space such that said pushed rod is constantly urged to move away from said gas space by said valve.

4. The electric nail gun as claimed in claim 2, wherein:

said safety assembly substantially extends in the first direction, and includes a first safety member that extends through said nail gun seat and that has said first end, a second safety member that has said second end and that is adjacent to said pushed rod, and a third safety member that interconnects said first and second safety members.

5. The electric nail gun as claimed in claim 4, wherein:

one of said second safety member and said third safety member has a-said positioning portions, and the other one of said second safety member and said third safety member has a safety body; and said adjusting assembly is mounted to said safety body.

6. The electric nail gun as claimed in claim 5, wherein:

said second safety member and said third safety member overlap each other; and said fastener member of said adjusting assembly extends through said safety body toward the one of said positioning portions, and said spring of said adjusting assembly resiliently biases said fastener member such that said fastener member engages the one of said positioning portions.

7. The electric nail gun as claimed in claim 1, wherein:

said safety assembly substantially extends in the first direction, and includes a first safety member that extends through said nail gun seat and that has said first end, a second safety member that has said second end and that is adjacent to said pushed rod, and a third safety member that interconnects said first and second safety members.

8. The electric nail gun as claimed in claim 7, wherein:

one of said second safety member and said third safety member has said positioning portions, and the other one of said second safety member and said third safety member has a safety body; and said adjusting assembly is mounted to said safety body.

9. The electric nail gun as claimed in claim 8, wherein:

said second safety member and said third safety member overlap each other; and said fastener member of said adjusting assembly extends through said safety body toward the one of said positioning portions, and said spring of said adjusting assembly resiliently biases said fastener member such that said fastener member engages the one of said positioning portions.

10. The electric nail gun as claimed in claim 1, wherein said cylinder unit includes a striking cylinder that defines said cylinder space, at least one storage cylinder that is adapted for storing the gas, and a cylinder lid that cooperates with said striking cylinder and said at least one storage cylinder to define said gas space, said at least one storage cylinder communicating with said gas space.

11. The electric nail gun as claimed in claim 1, wherein said muzzle unit further includes a spring that is mounted between said safety assembly and said nail gun seat, and that resiliently biases said safety assembly in the first direction.

12. The electric nail gun as claimed in claim 1, wherein said nail-striking unit further includes a lifting gear that is rotatably mounted between said cylinder unit and said muzzle unit, and that is operable to convert between a first state, in which said lifting gear meshes with said piston assembly and is drivable by electric power to urge said piston assembly to move away from said nail gun seat, and a second state, in which said lifting gear is separated from said piston assembly.

* * * * *